United States Patent
Cheng et al.

(10) Patent No.: US 12,486,887 B2
(45) Date of Patent: Dec. 2, 2025

(54) MECHANICAL EQUIPMENT

(71) Applicant: Fulian Precision Electronics (Tianjin) Co., LTD., Tianjin (CN)

(72) Inventors: Yen-Lu Cheng, New Taipei (TW); Hao-Wen Cheng, Neihu (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 180 days.

(21) Appl. No.: 18/392,116

(22) Filed: Dec. 21, 2023

(65) Prior Publication Data

US 2024/0337308 A1   Oct. 10, 2024

(30) Foreign Application Priority Data

Apr. 10, 2023  (CN) .......................... 202320774932.6

(51) Int. Cl.
*F16H 19/02* (2006.01)
(52) U.S. Cl.
CPC .................................. *F16H 19/02* (2013.01)

(58) Field of Classification Search
CPC .......... F16H 19/02; A47B 21/02; A47B 9/20; A47B 9/00
See application file for complete search history.

(56) References Cited

U.S. PATENT DOCUMENTS

| 2024/0130517 A1* | 4/2024 | Klein | A47B 9/20 |
| 2025/0213032 A1* | 7/2025 | Chunrong | A47B 9/20 |

* cited by examiner

*Primary Examiner* — Randell J Krug
(74) *Attorney, Agent, or Firm* — ScienBiziP, P.C.

(57) ABSTRACT

A mechanical equipment includes a fixed body and a movable body. The fixed body includes a sleeve. The movable body includes a limiting rod, a guiding rod, and a gear assembly. The guiding rod and the limiting rod are linked to each other through the gear assembly, which facilitates the positioning of the small sized and light limiting rod and the sleeve. The limiting rod and the sleeve can be aligned with a small force. After the guiding rod is aligned with the sleeve, the guiding rod and the limiting rod are linked through the gear assembly, the sleeve only bears the gravity of the limiting rod and does not need to bear the sum of the gravity of the limiting rod, the gear assembly, and the guiding rod, thus preventing the sleeve from bearing a too large gravity after the movable body and the fixed body are assembled.

16 Claims, 6 Drawing Sheets

MECHANICAL EQUIPMENT

FIELD

The subject matter herein generally relates to equipment installation, and more particularly, to a mechanical equipment.

BACKGROUND

Mechanical equipment may include two bodies configured to be assembled together. Such a mechanical equipment may be large or heavy, which is difficult to assemble or dissemble the two bodies by manpower. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
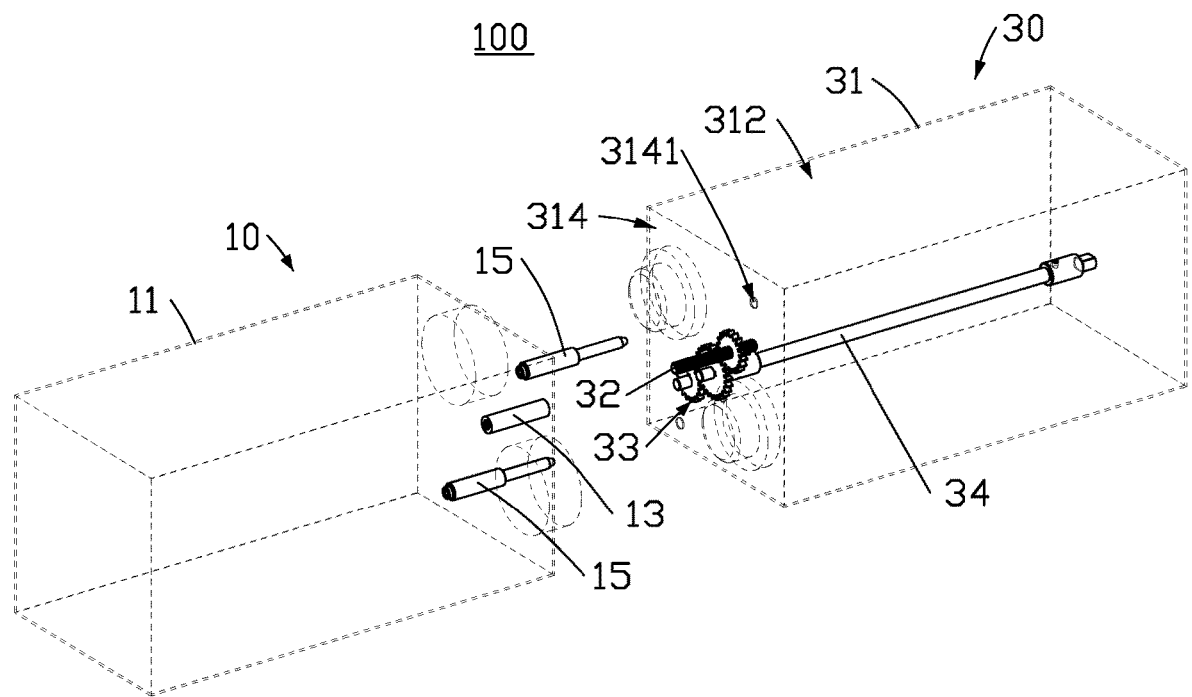
FIG. 1 is a diagrammatic view of an embodiment of a mechanical equipment according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, a mechanical equipment 100 is provided according to an embodiment of the present disclosure. The mechanical equipment 100 includes a fixed body 10 and a movable body 30. The movable body 30 can move toward and aligned with the fixed body 10, thereby installing the movable body 30 on the fixed body 10.

The fixed body 10 and the movable body 30 can be larger-sized and heavy equipment.

Figure 2:
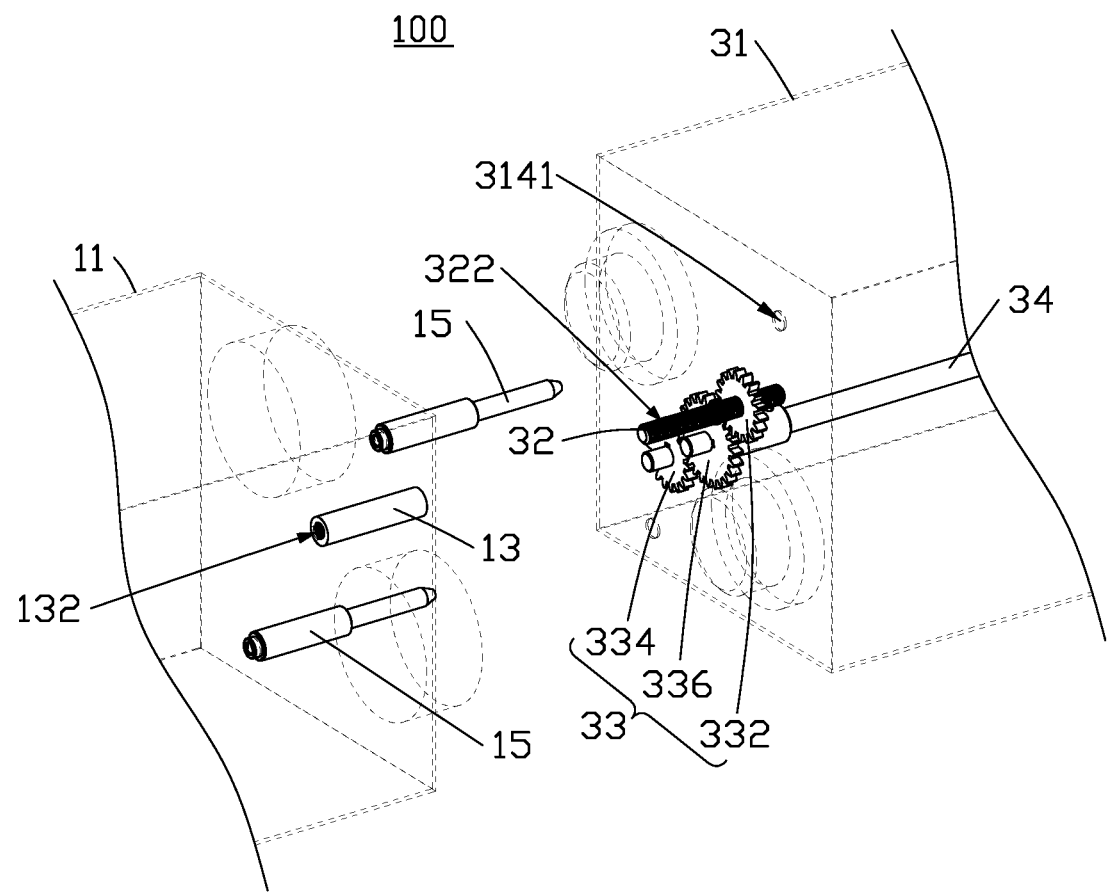
FIG. 2 is a diagrammatic view of a portion of the mechanical equipment of FIG. 1.
Figure 3:
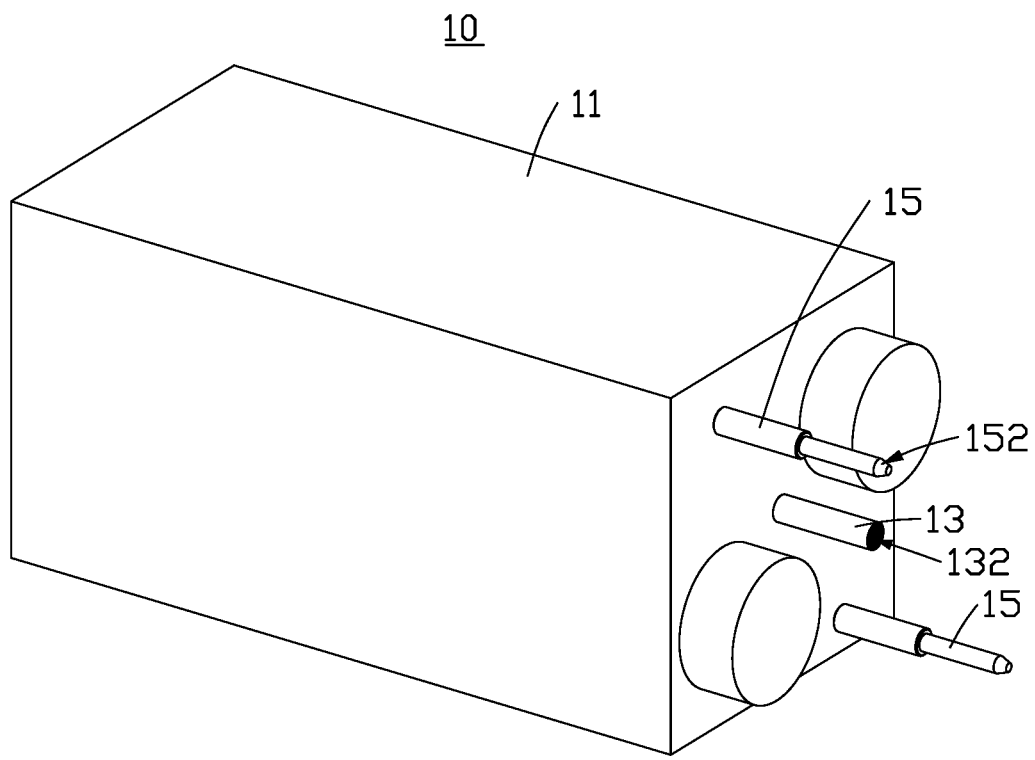
FIG. 3 is a diagrammatic view of a fixed body of the mechanical equipment of FIG. 1.

Referring to FIGS. 2 and 3, the fixed body 10 includes a first body portion 11, a sleeve 13, and at least one guiding pin 15. The sleeve 13 and the guiding pin 15 are fixed to a same side of the first body portion 11 and both protrude from a surface of the first body portion 11. In the embodiment, the fixed body 10 includes two guiding pins 15, and the two guiding pins 15 are disposed on opposite sides of the sleeve 13.

Figure 4:
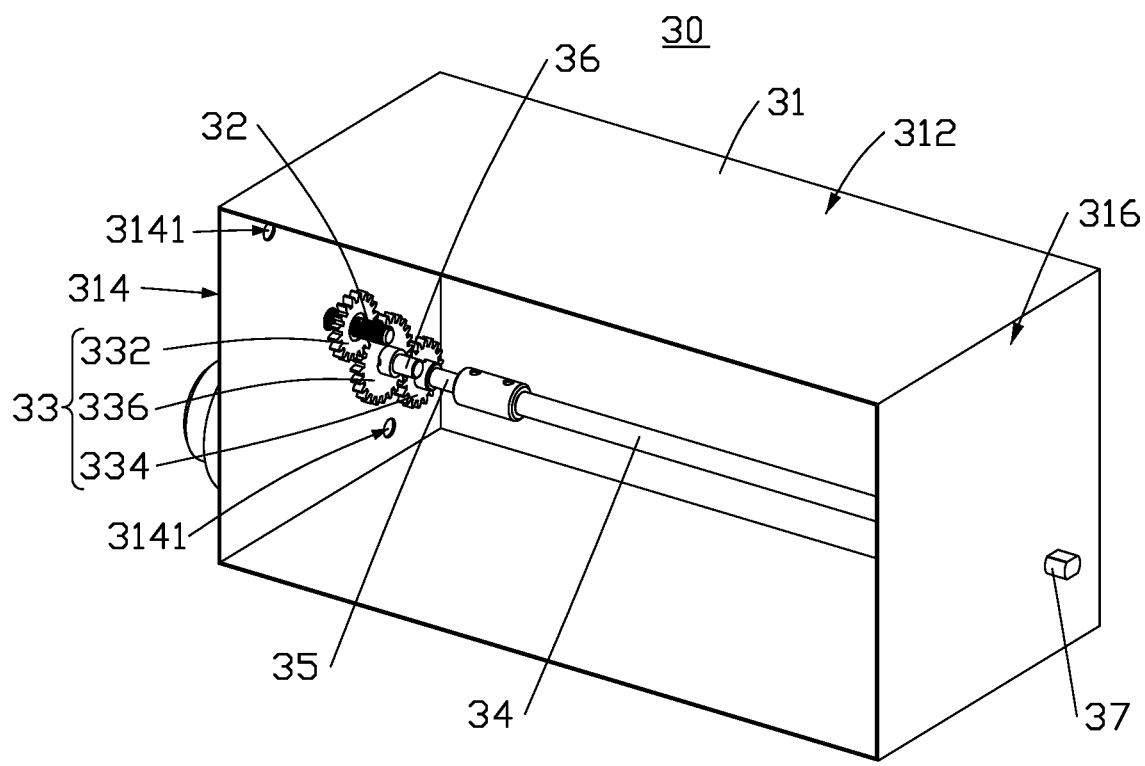
FIG. 4 is a cross-sectional view of a movable body of the mechanical equipment of FIG. 1.

Referring to FIG. 4, the movable body 30 includes a second body portion 31, a limiting rod 32, a gear assembly 33, and a guiding rod 34.

A cavity 312 is defined on the second body portion 31. The second body portion 31 further includes a first sidewall 314 and a second sidewall 316. The first sidewall 314 and the second sidewall 316 are opposite to each other. The first sidewall 314 faces the first body portion 11, and the second sidewall 316 is disposed on a side of the first sidewall 314 away from the first body portion 11. The first sidewall 314 and the second sidewall 316 are two sidewalls forming the cavity 312.

The limiting rod 32 extends through the first sidewall 314 and is rotatable relative to the first sidewall 314. A position of the limiting rod 32 corresponds to a position of the sleeve 13. The sleeve 13 is hollow inside and is provided with internal threads 132. An outer surface of the limiting rod 32 is provided with external threads 322. The limiting rod 32 and the sleeve 13 can be fixed to each other through an interaction between the internal threads 132 and the external threads 322, thereby fixing the movable body 30 to the fixed body 10.

The gear assembly 33 includes a plurality of gears. In the embodiment, the gear assembly 33 includes at least three gears, which are respectively named as a first gear 332, a second gear 334, and at least one connecting gear 336. All the gears are accommodated in the cavity 312. The connecting gear 336 is disposed between the first gear 332 and the second gear 334, and the connecting gear 336 is engaged with the first gear 332 and the second gear 334.

The limiting rod 32 extends through the first sidewall 314 and is fixed to the first gear 332. The limiting rod 32 is fixed at a center of the first gear 332. When the first gear 332 rotates, the limiting rod 32 can be driven to rotate around the center of the first gear 332.

The guiding rod 34 is received in the cavity 312, one end of the guiding rod 34 is relatively fixed to the second gear 334, and another end of the guiding rod 34 extends toward the second sidewall 316. The guiding rod 34 is fixed at a center of the second gear 334. When the second gear 334 rotates, the guiding rod 34 can be driven to rotate around the center of the second gear 334.

In the embodiment, the movable body 30 can further include a first fixing member 35. The first fixing member 35 and the second gear 334 are fixed to each other. The first fixing member 35 passes through the center of the second gear 334, and the second gear 334 is fixed on the second body portion 31 through the fixing member 35. Both ends of the first fixing member 35 extends through the second gear 334. One end of the first fixing member 35 is connected to the first sidewall 314 and can rotate relative to the first sidewall 314, and another end of the first fixing member 35 is fixed to the guiding rod 34. In other embodiments, one end of the guiding rod 34 can also be directly fixed to the second gear 334.

The connecting gear 336 is rotatably disposed on the first sidewall 314. The movable body 30 can further includes a second fixing member 36. The second fixing member 36 and the connecting gear 336 are fixed to each other. The second fixing member 36 extends through a center of the connecting gear 336. The connecting gear 336 is fixed on the second body portion 31 through the second fixing member 36. The second fixing member 36 is connected to the first sidewall 314 and can rotate relative to the first sidewall 314.

In some embodiments, the connecting gear 336 can be omitted, that is, the first gear 332 engaged with the second gear 334. When the connecting gear 336 is omitted, the second fixing member 36 can be omitted.

The movable body 30 can further include a knob 37, which is fixed to an end of the guiding rod 34 away from the second gear 334. The knob 37 extends through the second sidewall 316. One end of the knob 37 away from the guiding rod 34 protrudes from the second sidewall 316. The limiting rod 32 can be rotated by rotating the knob 37 and through actions of the guiding rod 34, the second gear 334, the connecting gear 336, and the first gear 332 in sequence.

At least one through hole 3141 is defined on the first sidewall 314. The position of the through hole 3141 correspond to the position of the guiding pin 15. The number of the through hole(s) 3141 is the same as the number of the guiding pin(s) 15. When the movable body 30 moves toward the fixed body 10, the guiding pin 15 can be inserted into the through hole 3141, thereby achieving positioning.

A length of the guiding pin 15 protruding from the first body portion 11 is greater than a sum of a length of the sleeve 13 and a length of the limiting rod 32 protruding from the first sidewall 314. When the movable body 30 moves towards the fixed body 10, the guiding pin 15 extends through the through hole 3141 to play a positioning role. At this time, the sleeve 13 and the limiting rod 32 are spaced apart from each other.

When there are a plurality of guiding pins 15 and a plurality of through holes 3141, the guiding pins 15 are disposed around the sleeve 13, and the through holes 3141 are defined around the limiting rod 32. When the movable body 30 moves toward the fixed body 10, through the cooperation between the guiding pins 15 and the through holes 3141, the positioning of the limiting rod 32 and the sleeve 13 can be more accurate.

An end of the guiding pin 15 away from the first body portion 11 is defined as an end portion 152. When the movable body 30 moves toward the fixed body 10, the end portion 152 extends through the through hole 3141. A size of the end portion 152 away from the first body portion 11 is smaller than a size of the end portion 152 close to the first body portion 11, so that the end portion 152 can more easily extend through the through hole 3141. In the embodiment, the end portion 152 is a truncated cone in shape.

Figure 5:
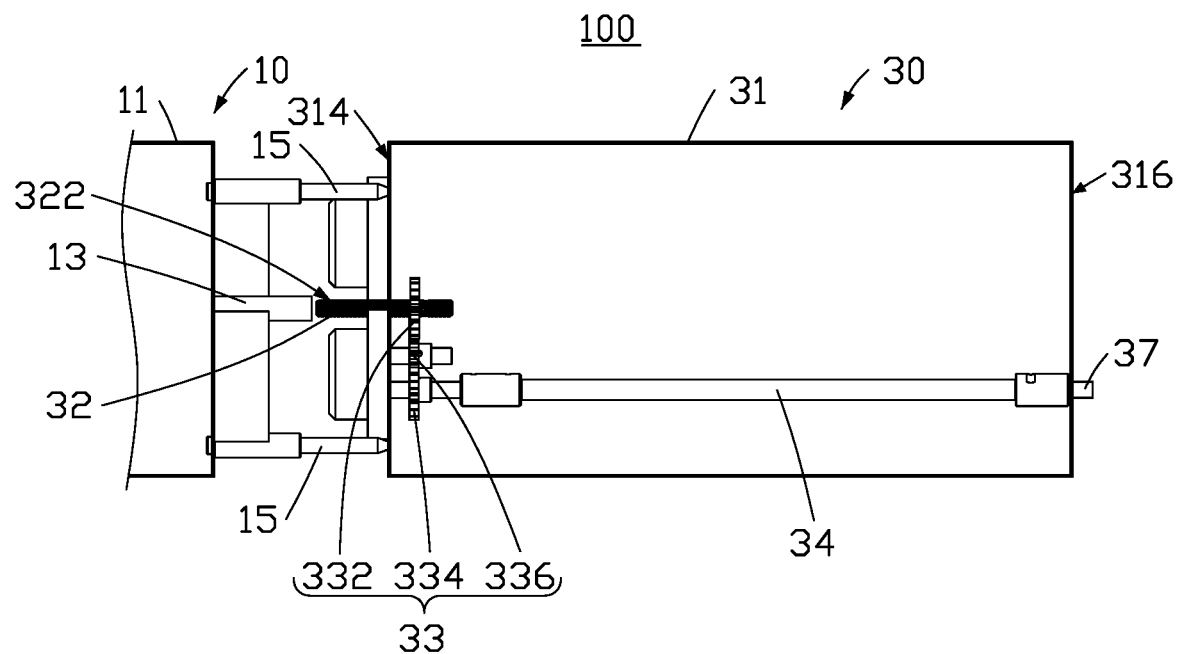
FIG. 5 is a cross-sectional view showing the movable body moving toward the fixed body.

Referring to FIG. 5, when the movable body 30 needs to be fixed to the fixed body 10, the movable body 30 moves toward the fixed body 10, and the guiding pin 15 extends through the through hole 3141 on the first sidewall 314. At this time, the sleeve 13 and the limiting rod 32 are spaced apart from each other.

Figure 6:
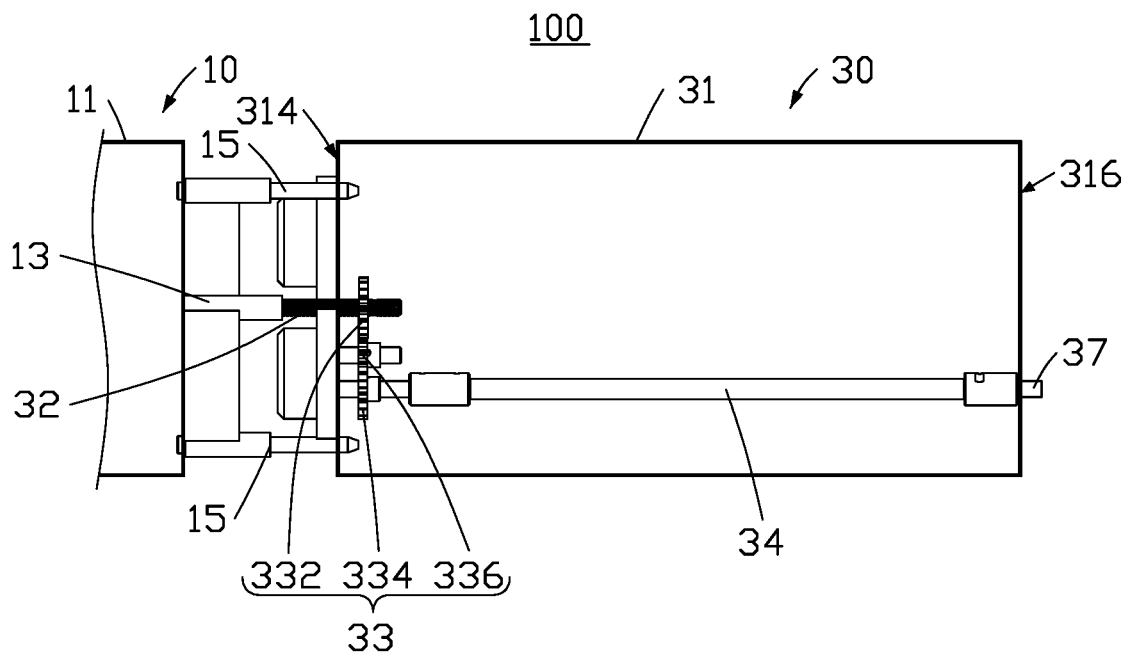
FIG. 6 is a cross-sectional view showing the movable body and the fixed body assembled together.

Referring to FIG. 6, the movable body 30 is further moved toward the fixed body 10 until the limiting rod 32 contacts the sleeve 13. Then the knob 37 is rotated. When the knob 37 is rotated, the guiding rod 34 is driven to rotate, and the rotation of the guiding rod 34 drives the second gear 334 to rotate, which in turn drives the connecting gear 336, the first gear 332 and the limiting rod 32 to rotate. The limiting rod 32 is gradually accommodated in the sleeve 13, and the external threads 322 of the limiting rod 32 and the internal threads 132 of the sleeve 13 are fixed to each other, thereby fixing the movable body 30 to the fixed body 10.

Compared with directly fixing the guiding rod 34 and the limiting rod 32, the guiding rod 34 and the limiting rod 32 are linked to each other through the gear assembly 33, which facilitates the positioning of the small sized and light limiting rod 32 and the sleeve 13. That is, the limiting rod 32 and the sleeve 13 can be aligned with a small force. After the guiding rod 34 is aligned with the sleeve 13, the guiding rod 34 and the limiting rod 32 are linked through the gear assembly 33, the sleeve 13 only bears the gravity of the limiting rod 32 and does not need to bear the sum of the gravity of the limiting rod 32, the gear assembly 33, and the guiding rod 34, thus preventing the sleeve 13 from bearing a too large gravity after the movable body 30 and the fixed body 10 are assembled.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A mechanical equipment comprising:
   a fixed body comprising:
      a first body portion; and
      a sleeve fixed to a surface of the first body portion; and
   a movable body comprising:
      a second body portion;
      a limiting rod configured to be fixed to the sleeve;
      a guiding rod; and
      a gear assembly comprising a first gear and a second gear, wherein the first gear and the second gear are engaged with each other, the limiting rod is fixed to the first gear, the guiding rod is fixed to the second gear, and the second gear is rotatably disposed on the second body portion;
   wherein the fixed body further comprises at least one guiding pin fixed on the first body portion, the second body portion comprises a first sidewall facing the at least one guiding pin, at least one through hole is defined on the first sidewall, each of the at least one guiding pin is configured to extend through a corresponding one of the at least one through hole, a length of the at least one guiding pin protruding from the first body portion is greater than a sum of a length of the sleeve and a length of the limiting rod protruding from the first sidewall.

2. The mechanical equipment of claim 1, wherein an end of the guiding pin away from the first body portion is defined as an end portion, a size of the end portion away from the first body portion is smaller than a size of the end portion close to the first body portion.

3. The mechanical equipment of claim 1, wherein the fixed body comprises a plurality of guiding pins, and the plurality of guiding pins is disposed around the sleeve.

4. The mechanical equipment of claim 1, wherein internal threads are disposed in the sleeve, external threads are disposed on the limiting rod, and the internal threads are configured to be engaged with the external threads.

5. The mechanical equipment of claim 1, wherein the movable body further comprises a knob, and the knob is fixed to the guiding rod.

6. The mechanical equipment of claim 1, further comprising a first fixing member, wherein the first fixing member is rotatably disposed on the second body portion, and the second gear is fixed on the first fixing member.

7. The mechanical equipment of claim 6, wherein the gear assembly further comprises at least one connecting gear, the at least one connecting gear is disposed between the first gear and the second gear, and the at least one connecting gear is engaged with the first gear and the second gear.

8. The mechanical equipment of claim 6, wherein internal threads are disposed in the sleeve, external threads are disposed on the limiting rod, and the internal threads are configured to be engaged with the external threads.

9. The mechanical equipment of claim 1, wherein the gear assembly further comprises at least one connecting gear, the at least one connecting gear is disposed between the first gear and the second gear, and the at least one connecting gear is engaged with the first gear and the second gear.

10. The mechanical equipment of claim 9, further comprising a second fixing member, wherein the second fixing member is rotatably disposed on the second body portion, and the at least one connecting gear is fixed on the second fixing member.

11. The mechanical equipment of claim 9, wherein internal threads are disposed in the sleeve, external threads are disposed on the limiting rod, and the internal threads are configured to be engaged with the external threads.

12. The mechanical equipment of claim 1, wherein the limiting rod is fixed at a center of the first gear, and the guiding rod is fixed at a center of the second gear.

13. The mechanical equipment of claim 12, wherein the gear assembly further comprises at least one connecting gear, the at least one connecting gear is disposed between the first gear and the second gear, and the at least one connecting gear is engaged with the first gear and the second gear.

14. The mechanical equipment of claim 12, wherein internal threads are disposed in the sleeve, external threads are disposed on the limiting rod, and the internal threads are configured to be engaged with the external threads.

15. The mechanical equipment of claim 12, wherein further comprising a first fixing member, wherein the first fixing member is rotatably disposed on the second body portion, and the second gear is fixed on the first fixing member.

16. The mechanical equipment of claim 15, wherein internal threads are disposed in the sleeve, external threads are disposed on the limiting rod, and the internal threads are configured to be engaged with the external threads.

* * * * *